US007003487B1

(12) United States Patent
Skirpa (10) Patent No.: US 7,003,487 B1
(45) Date of Patent: Feb. 21, 2006

(54) AUTOMATED MANAGEMENT SYSTEM

(76) Inventor: Alexander R. Skirpa, 702 W. Montgomery Ave., Rockville, MD (US) 20850

( * ) Notice: Subject to any disclaimer, the term of this patent is extended or adjusted under 35 U.S.C. 154(b) by 891 days.

(21) Appl. No.: 09/635,652

(22) Filed: Aug. 10, 2000

(51) Int. Cl.
G06F 17/60 (2006.01)

(52) U.S. Cl. .............................. 705/37; 705/1; 705/35; 705/7; 705/400; 705/500

(58) Field of Classification Search .................. 705/37, 705/35, 1, 400, 500
See application file for complete search history.

(56) References Cited

U.S. PATENT DOCUMENTS

| | | | | |
|---|---|---|---|---|
| 5,966,695 A | * | 10/1999 | Melchione et al. | 705/10 |
| 6,141,648 A | * | 10/2000 | Bonissone et al. | 705/10 |
| 6,216,108 B1 | * | 4/2001 | LeVander | 705/7 |
| 6,321,202 B1 | * | 11/2001 | Raveis, Jr. | 705/1 |

FOREIGN PATENT DOCUMENTS

JP 10091334 * 10/1999

OTHER PUBLICATIONS

Montana State University extension service guide MT199310 AG., Jun. 2003.*

* cited by examiner

Primary Examiner—James P. Trammell
Assistant Examiner—John M Winter
(74) Attorney, Agent, or Firm—Andrew Bodendorf (57) ABSTRACT

A bid estimating system and method is provided according to an exemplary embodiment of the invention includes a processor that accesses a database of existing customer information specific to that customer. The processor identifies information specific to the customer stored in the database and determines an estimate, in real time, for the services provided based on the customer specific information. The estimate is then conveyed to the customer for their approval. According to one preferred embodiment the service provider is a landscaper. According to this embodiment the potential customer provides the customer's address. A processor then access a real estate database for the address and determines a bid based on the database information corresponding to the address. Alternatively, a landscaper can create accurate bids for mailers simply by identifying an address and selecting the types of services to be performed in order to determine the cost of the services.

41 Claims, 5 Drawing Sheets

| | ADDRESS | LOT SIZE | SQ. FT. TOTAL | SQ. FT. GARAGE | NUMBER OF STORIES | HAS DECK | LEAF REMOVAL NO HAULING | BUILDINGS FOOTPRINT SQ. FT. | LAND LESS BUILDINGS SQ. FT. | LEAF REMOVAL WITH HAULING | TOTAL LOT SIZE SQ. FT. |
|---|---|---|---|---|---|---|---|---|---|---|---|
| 1 | | | | | | | | | | | |
| 2 | 5310 Moorland Ln | 0.649 | 1772 | 288 | 2 | Yes | 613 | 879 | 27392 | 662 | 28270 |
| 3 | 5817 Bradley Blvd | 0.351 | 1610 | 360 | 1 | Unk. | 318 | 1165 | 14125 | 367 | 15290 |
| 4 | 7837 Aberdeen Rd | 0.254 | 1448 | 360 | 2 | Unk. | 230 | 843 | 10222 | 279 | 11064 |
| 5 | 8007 Aberdeen Rd | 0.27 | 1448 | 360 | 2 | Yes | 245 | 843 | 10919 | 294 | 11761 |
| 6 | 5506 Lambeth Rd | 0.234 | 1870 | | 1 | Unk. | 209 | 935 | 9258 | 258 | 10193 |
| 7 | 5603 Namakagan Rd | 0.201 | 1385 | 299 | 1 | Unk. | 175 | 992 | 7764 | 224 | 8756 |
| 8 | 9307 Chanute Dr | 0.204 | 1392 | | 1 | Unk. | 184 | 696 | 8190 | 233 | 8886 |
| 9 | 7609 Honeywell Ln | 0.248 | 1560 | 308 | 2 | Unk. | 224 | 828 | 9975 | 273 | 10803 |
| 10 | 5507 Albia Rd | 0.195 | 1272 | 264 | 2 | Yes | 176 | 688 | 7806 | 225 | 8494 |
| 11 | 5300 Westpath Way | 0.222 | 1064 | 240 | 2 | Unk. | 204 | 595 | 9076 | 253 | 9670 |
| 12 | 9312 Renshaw Dr | 0.392 | 1667 | 484 | 2 | Unk. | 360 | 1040 | 16036 | 409 | 17076 |
| 13 | 9308 Renshaw Dr | 0.373 | 1269 | 502 | 2 | Unk. | 344 | 925 | 15323 | 393 | 16248 |
| 14 | 9304 Renshaw Dr | 0.367 | 2320 | 552 | 1 | Unk. | 322 | 1712 | 14275 | 371 | 15987 |
| 15 | 7028 Barkwater Ct | 0.252 | 1313 | 315 | 2 | Yes | 230 | 753 | 10224 | 279 | 10977 |
| 16 | 7032 Barkwater Ct | 0.254 | 1313 | 315 | 2 | Unk. | 232 | 753 | 10312 | 281 | 11064 |
| 17 | 7016 Barkwater Ct | 0.268 | 1154 | 299 | 2 | Yes | 247 | 684 | 10990 | 296 | 11674 |
| 18 | 6750 River Trail Ct | 0.24 | 1537 | 250 | 1 | Yes | 213 | 1019 | 9436 | 262 | 10454 |

AUTOMATED MANAGEMENT SYSTEM

BACKGROUND

This invention relates to an automated management system and in particular to a landscaping bid estimation system and method.

As the market place for consumer services tighten, companies are always looking for new and innovative ways to provide higher quality service and reduced cost. The market for landscaping consumers is no different. Landscaping companies typically perform different services for businesses and homeowners ranging from up-keep and maintenance of existing grounds (e.g., mowing, tree trimming and pruning, leaf collection, edging, mulching brush removal), installation (e.g., new plantings, lighting, retaining walls, patios, etc.) and consulting/designing for future developments.

These services may be provided on a one time basis or as part of a service contract (e.g., weekly, monthly, seasonally, or yearly). When contacted by a potential customer, the service provider is usually asked to quote a rate or price at which the requested service can be provided. In many instances, this may take the form of telephone call to the service provider requesting a quote for the job. This poses a particular problem to the service provider. Often potential customers want an immediate quote of an estimate over the phone. This places the service provider in an awkward position. In this case, it is difficult to provide an estimate without seeing the size of the job being requested.

For example, for landscaping the cost of the service, such as, weekly mowing, depends on the size of the job. However, the service provider does not know the size of the job. One option is for the service provider to have a standard rate. However, this can result in giving a quote that is too large or too small for any particular job, either of which could result in loss of the customer.

As a result, most service providers must send an employee to the customer's site to inspect it and generate an estimate based on the inspection. While this is a practice excepted by many customers (and service providers), people are increasingly busy and do not want to be bothered with setting up an appointment time. In addition, some consumers demand instant information on pricing. If the service provider insists on visiting the potential customer to give an estimate, the service provider risks losing the customer's potential business. Furthermore, it costs the service provider time and money to train employees to provide the skills necessary to provide estimates and in travel to and from the potential job site. In addition, estimates given are customarily done without charge.

SUMMARY

It is therefore an object of the invention to provide an accurate estimate of the cost of providing a service in real time without having to visit the customer's site.

It is therefore an object of the invention to provide estimates without the need to train an employee to perform the task or consume service provider resources.

It is yet another object of the invention to gain a competitive advantage over competitor by providing free an accurate estimates with minimal effort.

It is yet another object of the invention to provide a means of licensing service provider franchises to different areas and provide a database of information that allows the service provider to accurately estimate the cost of potential jobs for perspective clients and provide accurate quotes to those clients.

According to an exemplary embodiment of the present invention, the foregoing and other objects are accomplished through implementation of a bid estimating system and method. According to an exemplary embodiment of the invention, a processor accesses a database of existing customer information specific to that customer. The processor identifies information specific to the customer stored in the database and determines an estimate, in real time, for the services provided based on the customer specific information. The estimate is then conveyed to the customer for their approval.

According to one preferred embodiment the service provider is a landscaper. According to this embodiment the potential customer provides the customer's address. A processor then access a real estate database for the address and determines a bid based on the database information corresponding to the address and the information can be obtained from a public database. Alternatively, a landscaper can create accurate bids for mailers simply by identifying an address and selecting the types of services to be performed in order to determine the cost of the services. According to an exemplary embodiment the bid can be generated and displayed using a spreadsheet.

According to the invention, a service provider is able to determine accurate bids without having to spend valuable time visiting the potential customers home or training other how to make accurate estimates. In addition, when the service provider receives cold calls requesting estimate, the provider can give accurate estimates over the phone and thus prevent loss of potentially impatient customers who demand immediate satisfaction.

According to another embodiment of the invention, a database of information for various areas is maintained. The areas can be organized according to, for example, postal zip codes. Service providers serving customers in those areas could by access to the database and receive software to facilitate access or calculation of estimates, or both. Access to the database could be provided, for example, over the Internet. A service provider to access the database in order to received data or estimates or both for potential customers. A service provider could be licensed for one or more zip codes.

BRIEF DESCRIPTION OF THE DRAWINGS

The foregoing and other features, objects, and advantages of the invention will be better understood by reading the following description in conjunction with the drawings, in which.

DETAILED DESCRIPTION

The various features of the invention will now be described with respect to the figures, in which like parts are identified with the same reference characters.

Figure 1:
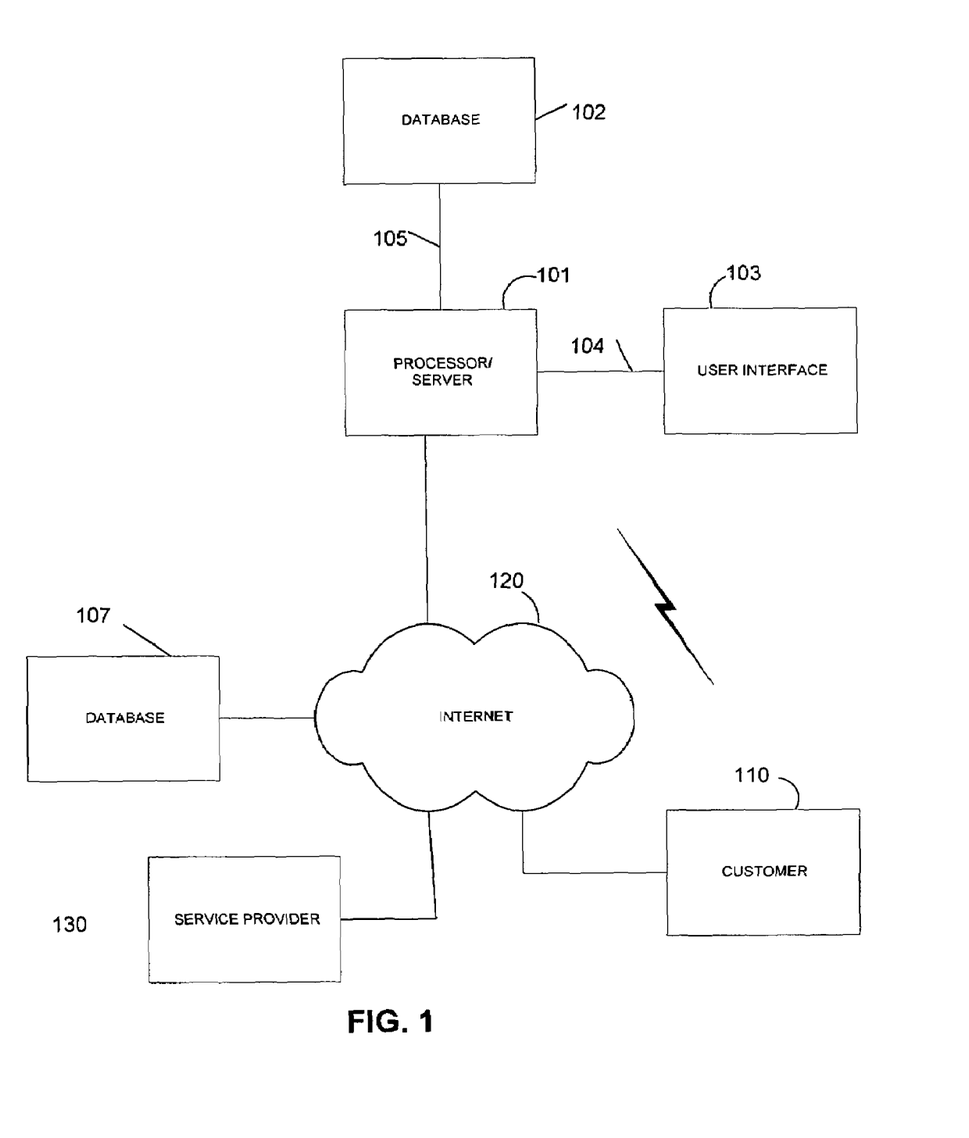
FIG. 1 is and exemplary block diagram according to an exemplary embodiment of the invention.

Turning to FIG. 1, a block diagram of an exemplary system is shown. According to the system shown in FIG. 1, a processor 101 is shown connected via communication device 105 to a database 102. The processor 101 can be a standalone personal computer (PC), or remote host/server, for example. A user interface 103 can be provided for communication with the processor 101. Those skilled in the art will appreciate that the user interface 103 could be a standalone computer located remotely from the processor 101 communicating via communication device 104, for example a modem, network, wireless, internet, or other communications medium. Alternatively, the user interface 103 could include a display and input devices, such as a keyboard and mouse and be directly connected to the processor 101 at the user's location, for example, by bus or serial cable and could be part of one standalone PC type unit. The database 102 could be located at the user's site in a storage medium such as RAM, disk (e.g., optical, hard, soft, compact, etc.), tape, buffer. Alternatively, the database 107 located at a remote location via the communications device, such as, modem, network, wireless, internet 120, or other communications medium.

The customer 110 could contact the service provider in any of the number of ways. For example, the customer 110 could call the service provider and request an estimate for performing a certain job. In addition, the customer 110 could access the service provider's processor or server 101 through a communication device 130, such as a modem. According to yet another embodiment, the service provider could maintain a web page that is accessed by the customer 110 through the internet 120 as explained in further detail below using a browser running on a PC used to communicate with the service provider's processor/server 101.

According to the following description, an exemplary implementation of the system for use with a landscaping service provider will be shown, however, the invention could be used with other service providers according to the steps outlined below. According to this preferred embodiment, the user is a landscaping contractor, for example. Typically, the landscaper must give an estimation for the cost of providing landscaping services to a customer for customer approval before commencing a job. According to the present invention, the method and system provided herein allow the contractor to determine an accurate bid for the services to be provided without the need to actually visit and inspect the customer's location.

According to one aspect of the invention, the landscaper provides a customer identification to the processor 101 via user interface 103. According to one preferred embodiment this can be an address. The service provider also enters a type of service to be provided. The processor 101 then determines an estimated price for the services by accessing customer information provided in the database 102 or 107 as described in further detail in conjunction with the exemplary flow chart shown in FIG. 2. According to one exemplary embodiment the database is a real estate database, for example, Haines Company's "Criss+cross Plus Real Estate" database. Alternatively, any number of public databases could be used or other means such as aerial or satellite photographs or property sketches or plats (which can be used to generate property information).

Figure 2:
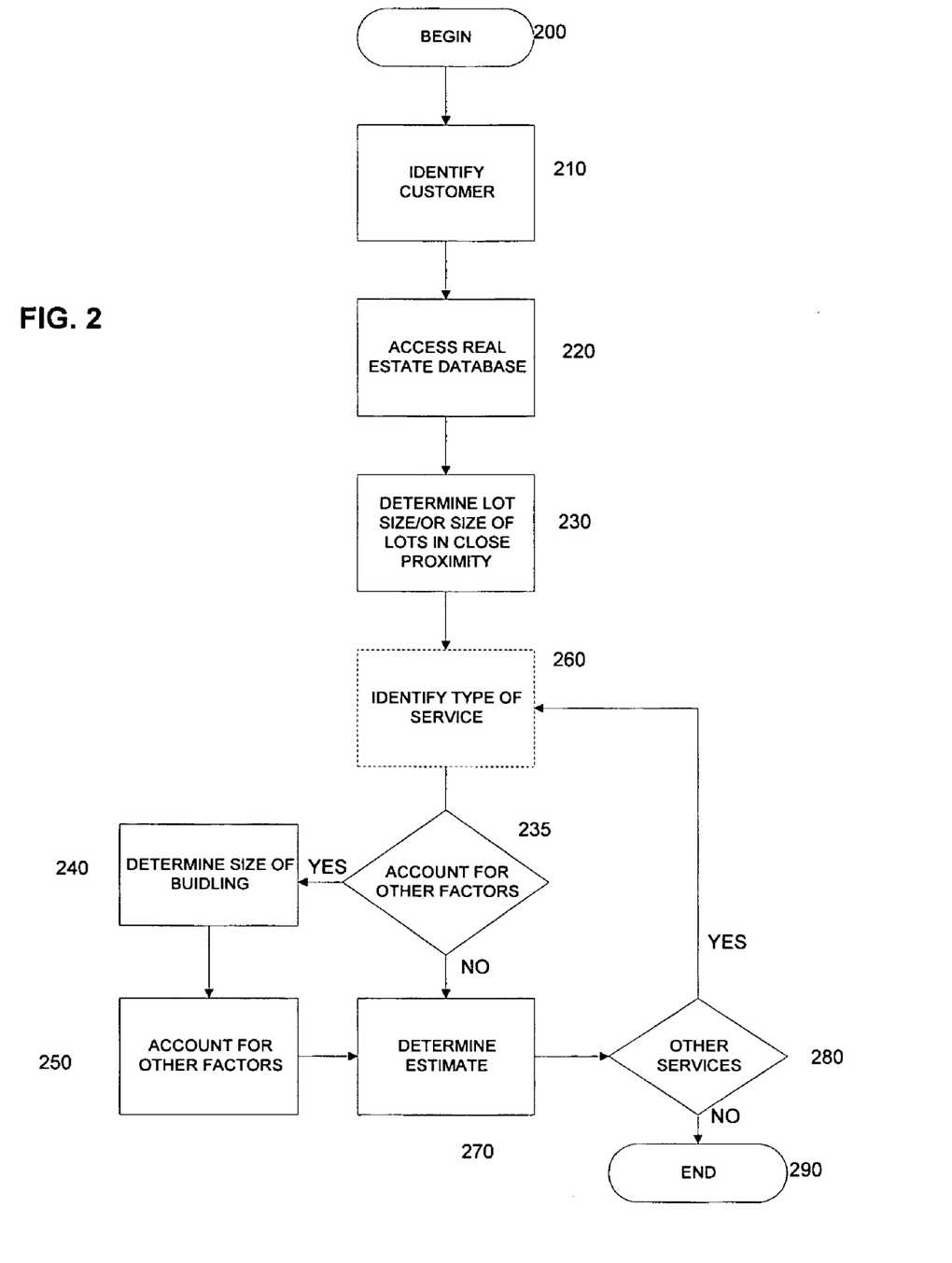
FIG. 2 shows an exemplary flow chart according to the invention.

After the processor receives the customer information from the database 102 or 107 it determines the estimate according to a formula provided for the type of service to be rendered. The customer information can be inserted directly into a spread sheet (such as Excel from Microsoft) to determine the estimate. One skilled in the art will appreciate that the formula used to calculate the estimate service will depend on the service to be provided. Examples of such formulas and factors are given below. Alternatively, the estimates can be pre-calculated and stored for each potential customer. In other words, all of the service provided by the service provider are calculated based on available customer data stored in a database, such as the Haines database mentioned above and stored with a customer identification. An advantage of this method is the speed at which customer quotes can be accessed. Additionally, this information can be used to produce mailers for all potential customers in a zip code. The mailers can be sent to potential customers with real quotes for the services even though the service provider has never visited the location.

Turning to FIG. 2, the process begins as step 200. First, the potential customer is identified at step 201. This identification for the purpose of the landscaper could be the customer's address. Of course other IDs such as name, telephone number, social security, etc., could also be used. In step 220, a real estate database is accessed. Next, the customer's lot size is retrieved or determined from the information contained in the database corresponding to the customer's address or ID at step 230. In addition, the type of service requested by the customer is also determined at step 260. Finally, an estimate for the requested service is determined based on the lot size, for example. This can be determined as follows.

In order to arrive at a more accurate estimate, the estimate can take into account additional information in the database. For example, the size of the house (square footage) can be subtracted from the lot size. In addition, the square footage can be reduced by a factor if the home is multiple stories, for example, by the square footage of an upper story. Furthermore, if there is additional information in the database, terrain, pools, decks, outer buildings, such as a garage, etc. these can also be taken into account. For example, if the terrain is steep, then a difficulty factor can be multiplied by the estimate in order to increase the price. If the terrain is flat with no trees, the estimate could be reduced. Additionally, information could be received from the customer.

In some instances, information may be missing or unavailable for a potential customer's property. In this case, an estimate can still be provided to the potential customer by accesses averages for service across an entire neighborhood. Although, it may not be as accurate, using surrounding properties for an estimate can provide an accurate estimate for the property in question. In addition, statistical averages could be used for neighbors to check the neighbors are receiving similar rates. This can be good for business as neighbors may be upset at substantial price discrepancies provided by the same company.

Figure 5:
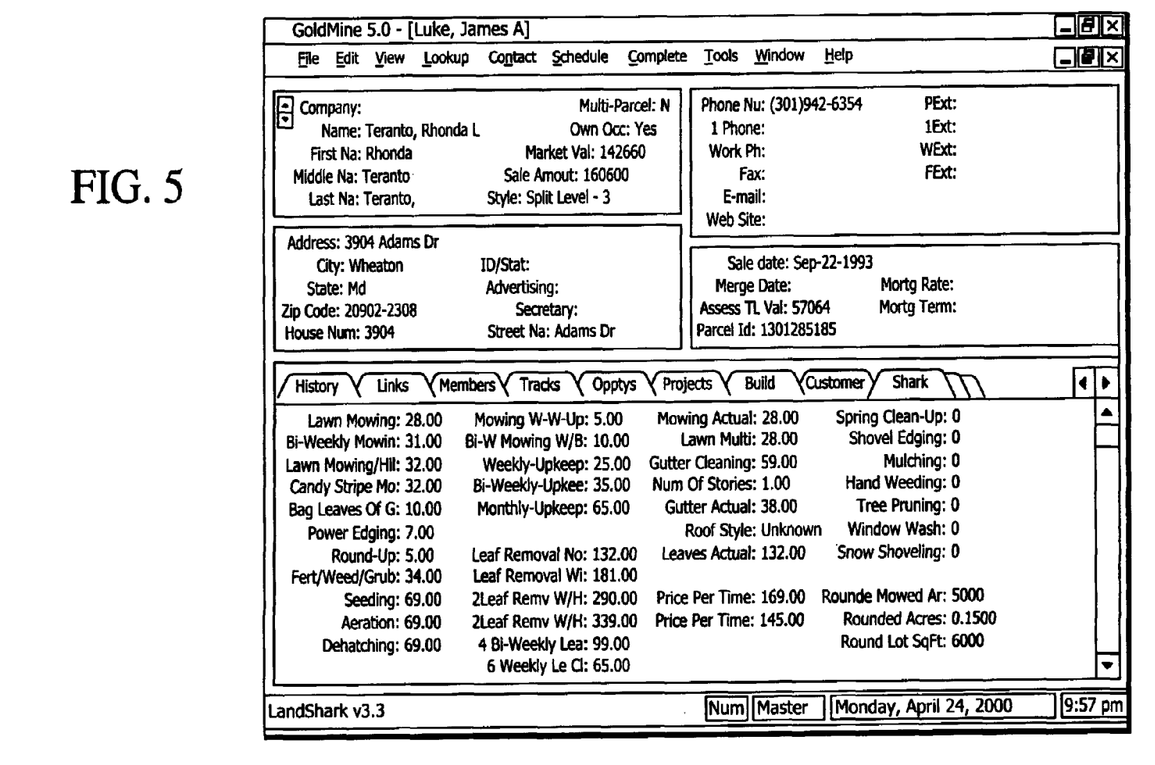

A previously mentioned, the steps 220, 230, 235, 240 250 and 270 could be pre-calculated for all services provided by the service provider. In this instance, a service provider would determine the potential customer's ID and type of service requested and be provided with a quote for the service. In another embodiment, the service provider would only need to enter a potential customer's ID and a display, for example, could be provided with quotes for all potential services (as shown in FIG. 5, for example).

According to another exemplary embodiment, the customer could receive a bid by accessing a web page provided by the landscaper. For example, the landscaper could provide a web page via a server on the processor 101 or through an internet service provider (ISP). The customer would access the web page using a browser running on the customer's PC using an HTML or XML based language, for example. The web page can contain advertising and direct the customer to enter requested information. For example, the customer would enter their name, address, phone number, email address, etc., and the types of services requested. The landscaper could then review the information and determine an estimate through the above-described procedure. The estimate could then be communicated to the customer via a telephone call or return email, for example. Alternatively, the quote could be provided automatically. For example, a search engine on the server could execute a CGI script to look up customer information and download it to the server. The processor 101 could then determine an estimate from the downloaded information. Alternatively, mailers could be generated for addresses taken from the database specifying rates for services that are tailored to the identification (e.g., address).

Estimates for any number of services could be provided such as lawn mowing, candystripe mowing, power edging, leaf collection, seeding, aeration, de-thatching, upkeep, landscaping, mulching. Of course other household chores could be estimated the using this information. For example, gutter cleaning could be provided based on the square footage and number of stories of the home listed. House cleaning could be determined based on the number rooms, bathrooms, square footage, etc.

According to one example, a customer telephones a landscape maintenance firm to request fall leaf removal services for his property at 5003 Namakagen Rd. The sales representative asks the customer for an identification. The identification is used to retrieve information about the customer's property from the database. As previously stated, the identification could be an address or phone number. In this example, the database contains mathematically and statistically calculated data used to derive landscape maintenance pricing specific to the customer's property.

In this hypothetical example, the service price was generated mathematically and statistically by first the determining the lot size for the property at 5003 Namakagen Rd. The lot size in this example is 0.301 acres. The lot size is multiplied it by 43560 to convert to square feed (i.e., 13111 sq.ft. of total land area).

Next, using the number of stories of the home, and the total sq. ft. of floor space in the home, it is determined how much area in sq.ft. the home takes up on the given property. In this instance, if the home is two stories, the number by the total sq.ft. of the home's floor area is divided by two. In this case the home has 1700 sq.ft. of floor area. This is divided by two to derive 850 sq.ft. of total area that the building takes up on the property.

Other structures that take up space can also taken into account, for example, a garage of 320 sq.ft (e.g., which can be derived by looking at the garage type, in this case, a "detached garage" with a capacity of "2"cars). The average one car garage is approximately 160 sq.ft. and therefore a two car garage can be estimated as equal 320 sq.ft. Other factors can also be taken into consideration, such as a deck, a patio, or whatever may be helpful in determining total service area without having to visit or directly measure the specific property. Items like a pool would not be included in this calculation because in the fall most people will put a pool cover on there pool, and the leaves will need to be cleaned of the pool cover. After all public data for the property and other factors are taken into consideration, 11070 sq.ft. of structure take up space on the lot.

Finally, after the total area that structures take up on the given lot is subtracted from the total sq. ft of property, it is determined that 2041 sq.ft. area remains for the given service to be rendered. Next a price structure is applied to the service area with minimum prices, maximums prices, price brakes for different property sizes, basic dollars and cents per sq.ft. For example, a factor for a specific type of service can be multiplied by the square footage to determine the bid price or a range of prices. Alternatively, the square footage could be compared to a preset number and the price could be assigned based on the relation to the number (e.g., higher, lower, equal, etc.).

Figure 3:
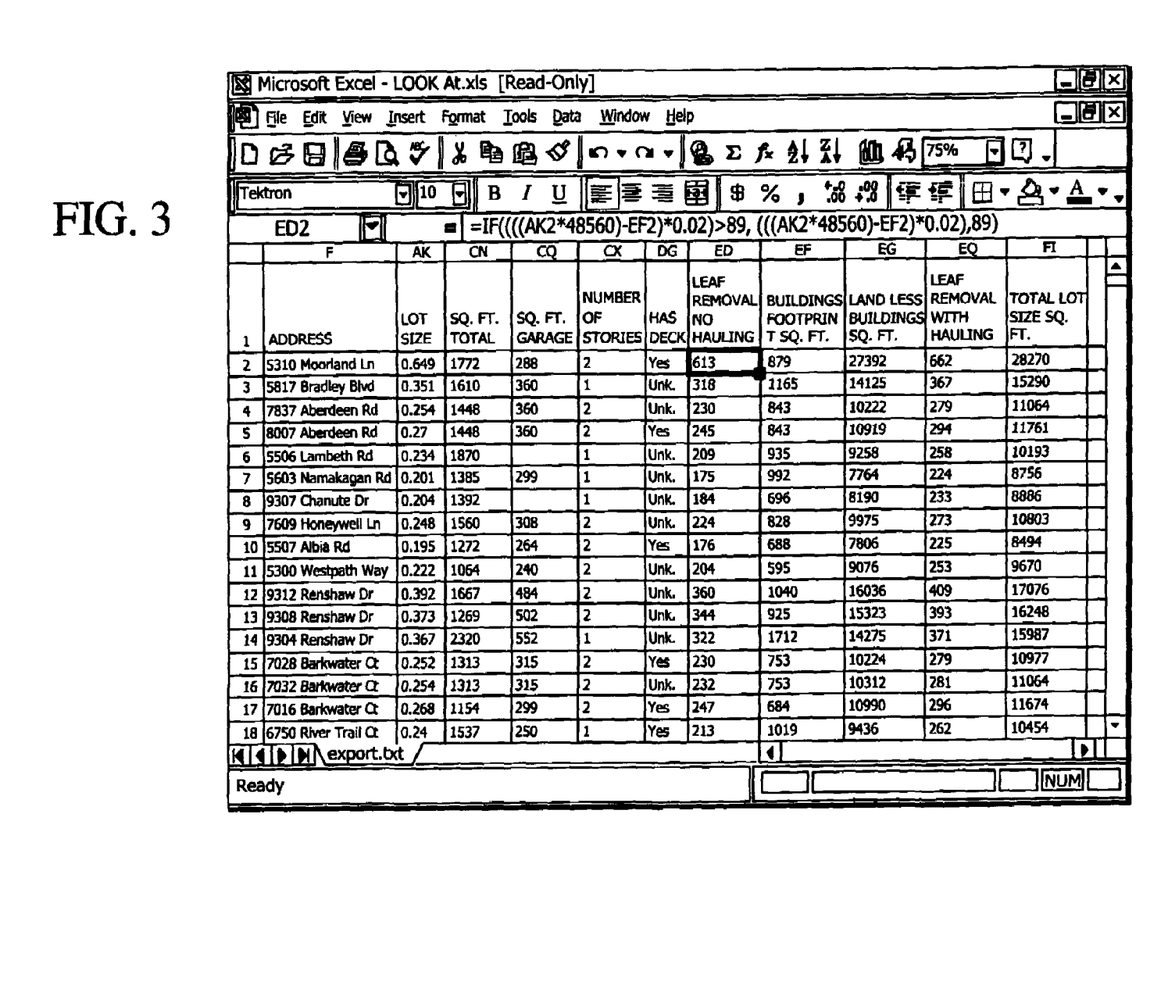
FIGS. 3, 4, and 5 are exemplary system displays for use with the present invention.

The following is an example of real estate raw data, comma delimited file, which can be imported into a program able to perform calculations:

1,"748.40","20882","Md","Patel, Jayashri G Et Al", "Gaithersburg","21411 Woodfield Rd",,,,,"116710",, "748.40","46684","31600","15084","20882- 4853", "Unknown","Unknown","Unknown","Unknown",, "Unknown","Laytonsville","Woo dfield Rd","Md", "Montgomery County Public Schools","999",,,,"Yes", "0",,"Unknown","Patel, Jayashri G","G","0.42",, "77.169281","Laytonsville",,"Patel, Jayashri G Et Al", "Impsres Land Of Goshen","39.208475","Patel", "Residential","21411","Jayashri",,,"Gaithersburg", "700101", "R035",,,"21411 Woodfield Rd","14866: 015","First American Title Insurance Company","N", "Life Estate Of Beatrice Addison","May-07- 1997", "85000","98.38","N",,"Deed","May-12-1997","May-02-1997","2",,"0",,,,,"14866 & 020","FHA","First American Title Insurance Company","2027",,,,"May-12-1997","May-02-1997","111650","Ft Mortgage Companies DBA Atlantic Coast Mortgage","Patel, Ganesh D","_______",,"0100000033","P","1936",, "Typical Single Family Unit Such As 1, 2 Or 3 Story", "864",,"864",,,,,"Unknown","Composition","Lower",, "1",,"1",,"1","Hot Water Radiator","Unk.","Unk.", "Unk.","Yes","Unk.","Unk.","Unk.","Unknown",, "Frame","Goo d",,"1","Residential","None","Unknown","Unknown","Unknow FIG. 3 is an example of price generation generated with an Excell spread sheet, and associated cell definitions with associated formulas found below. In this example, the cell definitions are as follows:

[EC=LAWN MOWING]=IF(FG2<40,FG2,IF(FG2>59, FG2,IF(FG2>50,45,35)))
[FG LAWN MULTIPLIER]=CEILING(IF(DZ2<3001,22, (DZ2/1000-6)*3+29),1)
[DZ=MOWED AREA SQFT]=(AK2*43560)-EE2
[AK2=LOT SIZE IN ACERS]
[EE2=NON MOWED AREA SQFT]=(CN2/(CX2+1) +CQ2)+(IF(DD2="Yes",1000,0))+(IF(DE2="Yes",100, 0))+(IF(DF2="Yes",100,0))+(IF(DG2="Yes",200,0))+ (IF(DH2="Yes",400,0))+(IF(DI2="Yes",200,0))+(IF (DJ2="Yes",400,0))
CN2=SQFT TOTAL OF FLOOR AREA IN A GIVEN HOUSE=HAINES GIVEN DATA INPUT
CX2=NUMBER OF STORES IN A GIVEN HOUSE=HAINES GIVEN DATA INPUT
CQ2=SQFT GARAGE=HAINES GIVEN DATA INPUT
DD2=HAS POOL (YES OR NO)=HAINES GIVEN DATA INPUT
DE2=HAS POLE BARN (YES OR NO)=HAINES GIVEN DATA INPUT
DF2=HAS PATIO (YES OR NO)=HAINES GIVEN DATA INPUT
DG2=HAS DECK (YES OR NO)=HAINES GIVEN DATA INPUT
DH2=HAS CONCRETE PAVING (YES OR NO)=HAINES GIVEN DATA INPUT
DI2=HAS CARPORT
DJ2=HAS BLACKTOP PAVING

Figure 4:
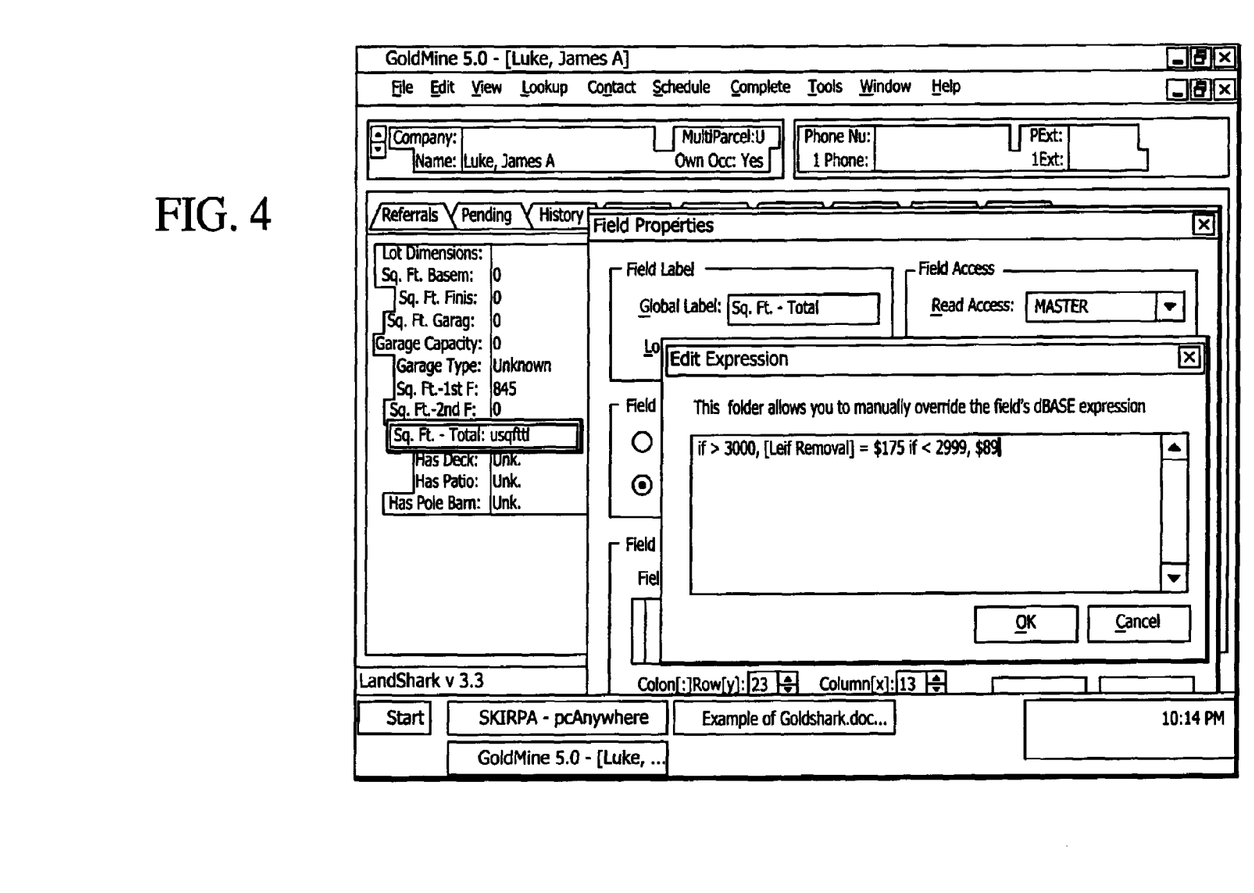

FIG. 4 is an example of Sales Person Interface. FIG. 5 is an example of an example of administrator interface.

According to another embodiment of the invention, a database of information for various regions is maintained. The regions can be organized according to, for example, postal zip codes. Service providers serving customers in those areas could by access to the database and receive software to facilitate access or calculation of estimates, or both. For example, a database could be provided on a server. The server could be contacted directly using a communication line and interface. Alternatively, the server could be accessed through the Internet. A service provider would be granted access to the database through the server. The service provider purchases a password and a license for a specific region as demarcated by zip codes. The database provides quotes for the service provider for a specific region. The database could be downloaded to the service providers computer or the service provider could look-up specific potential customer Ids in the database. A service provider could be licensed for one or more zip codes. Additionally, one or more servers could be set up for different services. For example, each server could correspond to a web page dedicated to a specific service. Potential customers could also access the web as described above to receive quotes.

According to the present invention the customer does not have to waste time setting up an appointment for an estimate that the customer may or may not accept. In addition, the customer did not have to waste time by allowing several different companies estimate his land by visiting. The customer does not have to let strangers he has never met wander his property in order for him to have a price quoted to him for a simple service such as leaf removal.

Customers can be solicited through the internet. Other customers can gained through direct mail campaigns where customers do not request bid but receive an Annual Maintenance Estimate, which includes basic property maintenance items like mowing, fertilizing, weed, bug, and grub control, aeration, de-thatching, leaf removal, even gutter cleaning. The bids can be accurately given for the customer because the bids are tailored to the customer's property using the database and method described herein.

Customers can other be solicited over the Internet. Automatic quotes for services for a customer's specific property's maintenance needs could be provided to customers over a web site called, for example, www.mownow.com using net-quote. In this embodiment customers have only to enter their address, for example, to receive a reasonable price for their property needs.

According to the present invention, a service provider is given a powerful tool to provide estimated for services to be provided to customers. The service provider can quickly provide an accurate estimate without out having to travel to the location. This is a big advantage by saving time and money. In addition, the service provider is able to handle cold calls without having hedge on the estimate or risk the possibility of over or underbidding on any one project.

The present invention has been described by way of example, and modifications and variations of the exemplary embodiments will suggest themselves to skilled artisans in this field without departing from the spirit of the invention. The preferred embodiment are merely illustrative and should not be considered restrictive in any way. The scope of the invention is to be measured by the appended claims, rather than the preceding description, and all variations and equivalents that fall within the range of the claims are intended to be embraced herein.

What is claimed is:

1. A computer implemented method of determining an estimate for providing landscaping and property maintenance services, the method comprising:
   accessing a memory including information in a preexisting real estate database describing one or more real properties;
   determining the area of one of the one or more real properties;
   determining the area of one or more structures on the one or more real properties; and
   processing by a processor the determined area to generate an estimate of the cost of a landscaping or property maintenance service,
   wherein processing the determined area to generate an estimate includes accounting for the determined area of the one or more structures in the area of the real property.

2. A computer implemented method of determining an estimate for providing landscaping and property maintenance services, the method comprising:
   accessing a memory including information in a preexisting real estate database describing one or more real properties;
   determining the area of one of the one or more real properties;
   determining a customer identification; and
   processing by a processor the determined area to generate an estimate of the cost of a landscaping or property maintenance service
   wherein the area of the real property is determined using the customer identification.

3. The method of claim 2, wherein determining the customer identification includes the step of determining customer address.

4. A computer implemented method of determining an estimate for providing landscaping and property maintenance services, the method comprising:
   accessing a memory including information in a preexisting real estate database describing one or more real properties;
   determining the area of one of the one or more real properties;
   determining the area of the ground level of one or more structures on the one or more real properties: and
   processing by a processor the determined area to generate an estimate of the cost of a landscaping or property maintenance service,
   wherein processing the determined area to generate an estimate includes accounting for the determined ground level area of the one or more structures in the area of the real property.

5. A computer implemented method of determining an estimate for providing landscaping and property maintenance services, the method comprising:
   accessing a memory including information in a preexisting real estate database describing one or more real properties;
   determining the area of one of the one or more real properties;
   determining the total area of the ground level of one or more structures on the one or more real properties; and
   processing by a processor the determined area to generate an estimate of the cost of a landscaping or property maintenance service, wherein processing the determined area to generate an estimate includes accounting for the determined total area in the area of the real property.

6. A computer implemented method of determining an estimate for providing landscaping and property maintenance services, the method comprising:
   accessing a memory including information in a preexisting real estate database describing one or more real properties;
   determining the area of one of the one or more real properties;
   processing by a processor the determined area to generate an estimate of the cost of a landscaping or property maintenance service; and
   charging the customer the cost of the estimate for the services.

7. A computer implemented method of determining an estimate for providing landscaping and property maintenance services, the method comprising:
   accessing a memory including information in a preexisting real estate database describing one or more real properties;
   determining the area of one of the one or more real properties;
   processing by a processor the determined area to generate an estimate of the cost of a landscaping or property maintenance service, wherein the services to be provided are one of lawn mowing, candy-stripe mowing, power edging, leaf collection, seeding, aeration, dethatching, upkeep, landscaping, mulching, and gutter cleaning.

8. A computer implemented method of determining an estimate for providing landscaping and property maintenance services, the method comprising:
   accessing a memory including information in a preexisting real estate database describing one or more real properties;
   determining the area of one of the one or more real properties;
   processing by a processor the determined area to generate an estimate of the cost of a landscaping or property maintenance service, wherein processing the determined area to generate the estimate includes adjusting the estimate based on a factor determined from the database.

9. The method of claim 8, wherein adjusting the estimate by a factor includes adjusting the estimate based on the type of terrain of the real property where the service is to be provided.

10. The method of claim 1, wherein the one or more structures include a building on the real property.

11. The method of claim 1, wherein the one or more structures include at least one of a deck, a pool, a driveway, a garage, and a parking lot on the real property.

12. The method of claim 8, wherein adjusting the estimate by the factor includes adjusting the estimate is based on quotes for services of real properties within a region.

13. The method of claim 12, wherein the region is one of a neighborhood or zip code.

14. A method of determining an estimate for providing landscaping services to a customer, the method comprising the steps of:
   accessing a server;
   determining a landscaping or property maintenance service that is to be provided;
   accessing a memory, by the server, including a real estate database to determine the area of a real property;
   processing the determined area to generate an estimate of the cost of the landscaping or property maintenance service to be provided; and
   determining the area of one or more structures on the real property, wherein processing the determined area to generate an estimate includes accounting for the determined area of the one or more structures in the area of the real property.

15. A method of determining an estimate for providing landscaping services to a customer, the method comprising the steps of:
   receiving a request for the estimate for services;
   accessing a server in response to the received request;
   determining a landscaping or property maintenance service that is to be provided;
   accessing a memory, by the server, including a real estate database to determine the area of a real property;
   processing the determined area to generate an estimate of the cost of the landscaping or property maintenance service to be provided in response to the received request; and
   providing an indication of the estimate.

16. The method of claim 15 wherein receiving the request and providing the indication are providing using a browser compatible language.

17. A method of determining an estimate for providing landscaping services to a customer, the method comprising the steps of:
   determining a customer identification:
   accessing a server;
   determining a landscaping or property maintenance service that is to be provided;
   accessing a memory, by the server, including a real estate database to determine the area of a real property; and
   processing the determined area to generate an estimate of the cost of the landscaping or property maintenance service to be provided
   wherein the area of the real property is determined from the customer identification.

18. The method of claim 17, wherein determining the customer identification includes determining the customer address.

19. A method of determining an estimate for providing landscaping services to a customer, the method comprising the steps of:
   accessing a server;
   determining a landscaping or property maintenance service that is to be provided;
   accessing a memory, by the server, including a real estate database to determine the area of a real property;
   determining the area of the ground level of one or more structures on the real property; and
   processing the determined area to generate an estimate of the cost of the landscaping or property maintenance service to be provided,
   wherein processing the determined area to generate an estimate includes accounting for the determined ground level area of the one or more structures in the area of the real property the customer's address.

20. A method of determining an estimate for providing landscaping services to a customer, the method comprising the steps of:
   accessing a server;
   determining a landscaping or property maintenance service that is to be provided;
   accessing a memory, by the server, including a real estate database to determine the area of a real property;

determining the area of the ground level of one or more structures on the real property; and processing the determined area to generate an estimate of the cost of the landscaping or property maintenance service to be provided, wherein processing the determined area to generate an estimate includes accounting for the determined ground level area of the one or more structures in the area of the real property.

21. The method of claim 20 wherein the service to be provided is one of lawn mowing, candy-stripe mowing, power edging, leaf collection, seeding, aeration, de-thatching, upkeep, landscaping, mulching, and gutter cleaning.

22. A system to determine an estimate for providing landscaping and property maintenance services to a customer, the system comprising:

an interface to receive an indication of a service that is to be provided to the customer;

a real estate database to store information describing one or more real properties including area of the properties; and a processor to access the stored information and to process an area of one of the real properties to generate an estimate of cost for the landscaping or maintenance service using the area of the real property.

23. The system of claim 22, wherein the user interface is configured to receive a customer identification and the processor is configured to generate the estimate based on the identification.

24. The system of claim 22, wherein said the customer identification is a location of the real property.

25. A system to determine an estimate for providing landscaping and property maintenance services to a customer, the system comprising:

an interface to receive information from a real estate database describing one or more real properties including area of the properties; and a processor to process an area of one of the real properties corresponding to the received information to generate an estimate of cost for the landscaping or maintenance service using the area of the real property wherein the services to be provided are one of lawn mowing, candy-stripe mowing, power edging, leaf collection, seeding, aeration, de-thatching, upkeep, landscaping, mulching, and gutter cleaning.

26. A system to determine an estimate for providing landscaping and property maintenance services to a customer, the system comprising:

a real estate database to store information describing one or more real properties including area of the properties; and a processor to access the stored information and to process an area of one of the real properties to generate an estimate of cost for the landscaping or maintenance service using the area of the real property, wherein the processor is configured to adjust the estimate based on a factor determined from the database.

27. The system of claim 26, wherein in said factor is the type of terrain of a location of the real property where the service is to be provided.

28. The system of claim 26, wherein the processor is configured to generate an estimate by determining the area of the real property and subtracting the area of one or more structures on the real property.

29. The system of claim 26, wherein in the one or more structures are is are one of a deck, a pool, a driveway, a garage, a parking lot, and a building.

30. The system of claim 26, wherein the processor is configured to generate an estimate based on the area of the real property subtracting the square footage of a ground level of one or more structures on the real property.

31. A system to determine an estimate for providing landscaping and property maintenance services to a customer, the system comprising:

a real estate database to store information describing one or more real properties including area of the properties;

a processor to access the stored information and to process an area of one of the real properties to generate an estimate of cost for the landscaping or maintenance service using the area of the real property; and a server connected to the processor and the database to provide access to the customer to obtain the estimate, to receive a customer identification, to provide the customer identification to the processor, wherein and the processor is configured to generate the estimate using the customer identification.

32. The system of claim 31 wherein the server is configured to provide access to a service provider to obtain the estimate, to receive the customer identification from the service provider, and to provide the customer identification to the processor to generate the estimate.

33. The system of claim 25, wherein the property maintenance service is gutter cleaning and the area of the structure is the perimeter of the structure.

34. A computer implemented method of determining an estimate for providing property maintenance services, the method comprising:

accessing a memory including information in a preexisting real estate database describing one or more real properties;

determining the area of one of a structure on the one or more real properties; and processing by the computer the determined area of the structure to generate an estimate of the cost of the property maintenance service, wherein the property maintenance service is gutter cleaning.

35. The method of claim 34, wherein the area of the structure is the perimeter of the structure.

36. Software in a computer usable medium to determine an estimate for providing landscaping and property maintenance services including instructions to cause a processor to:

access a real estate database describing one or more real properties;

determine the area of one of the one or more real properties;

process the determined area to generate the estimate of the cost of a landscaping or property maintenance service; and provide the customer the cost of the estimate for the service.

37. The method of claim 1 wherein accounting for the determined area of the one or more structures in the area of the real property includes subtracting the determined area of the one or more structures from the area of the real property.

38. The method of claim 4 wherein accounting for the determined ground level area of the one or more structures in the area of the real property includes subtracting the determined ground level area of the one or more structures from the area of the real property.

39. The method of claim 5 wherein processing the determined area to generate an estimate includes accounting for the determined total area in the area of the real property includes subtracting the determined total area from the area of the real property.

40. The method of claim 14 wherein accounting for the determined area of the one or more structures in the area of the real property includes subtracting the determined area of the one or more structures from the area of the real property.

41. The method of claim 19 wherein accounting for the determined ground level area of the one or more structures in the area of the real property the customer's address includes subtracting the determined ground level area of the one or more structures from the area of the real property the customer's address.

* * * * *